(12) United States Patent
Scheibel

(10) Patent No.: US 10,407,073 B2
(45) Date of Patent: Sep. 10, 2019

(54) ELECTRO-HYDRAULIC TRACTION SUPPORT

(71) Applicant: Continental Automotive Systems, Inc., Auburn Hills, MI (US)

(72) Inventor: Joerg Scheibel, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 254 days.

(21) Appl. No.: 15/057,794

(22) Filed: Mar. 1, 2016

(65) Prior Publication Data

US 2016/0176406 A1 Jun. 23, 2016

Related U.S. Application Data

(63) Continuation-in-part of application No. 13/707,767, filed on Dec. 7, 2012, now abandoned.
(Continued)

(51) Int. Cl.
*B60K 6/12* (2006.01)
*B60W 30/18* (2012.01)
(Continued)

(52) U.S. Cl.
CPC ......... *B60W 30/18172* (2013.01); *B60K 6/12* (2013.01); *B60K 7/0015* (2013.01); *B60K 17/02* (2013.01); *B60K 17/14* (2013.01); *B60T 1/10* (2013.01); *B60T 8/3205* (2013.01); *B60T 8/4827* (2013.01); *B60T 10/04* (2013.01); *B60W 10/02* (2013.01); *B60W 10/188* (2013.01); *F16D 57/06* (2013.01); *F16D 61/00* (2013.01); *B60K 17/043* (2013.01); *B60K 2007/0061* (2013.01); *B60W 2520/14* (2013.01); *B60W 2540/18* (2013.01); *B60W 2710/021* (2013.01);
(Continued)

(58) Field of Classification Search
CPC .............................. B60T 8/322; B60K 17/356
USPC ................................................ 180/242, 243
See application file for complete search history.

(56) References Cited

U.S. PATENT DOCUMENTS 5,101,925 A * 4/1992 Walker ................ B60K 17/356
180/243
5,263,401 A * 11/1993 Walker ................ B60K 17/356
180/243

(Continued)

*Primary Examiner* — Tony H Winner

(57) ABSTRACT

A traction control system is provided for a vehicle having wheels driven on a primary axle via an engine, and wheels on a secondary axle torsionally isolated from the engine. Wheel speed sensors and brakes are provided for each wheel. A motor/hydraulic pump is operatively associated with each secondary axle wheel for selectively powering the secondary axle wheel or being regenerativly powered by the secondary axle wheel for regenerative braking. A clutch is provided to connect each secondary axle wheel with the secondary axle wheel's motor/hydraulic pump. An accumulator is provided to hydraulically power the secondary axle wheels and to accept regenerative pressure from the secondary axle wheel's motor/hydraulic pump. A wheel valve is provided for each respective secondary axle wheel for selectively connecting the secondary axle wheel's motor/ hydraulic pump with the accumulator. A controller is provided to control the primary axle and secondary axle wheels. The controller commands braking and powering of the primary and secondary axle wheels during low traction events.

20 Claims, 4 Drawing Sheets

Related U.S. Application Data

(60) Provisional application No. 61/578,573, filed on Dec. 21, 2011.

(51) Int. Cl.
| | |
|---|---|
| *B60W 10/02* | (2006.01) |
| *B60W 10/188* | (2012.01) |
| *B60K 7/00* | (2006.01) |
| *B60K 17/02* | (2006.01) |
| *B60K 17/14* | (2006.01) |
| *B60T 8/32* | (2006.01) |
| *B60T 8/48* | (2006.01) |
| *B60T 1/10* | (2006.01) |
| *B60T 10/04* | (2006.01) |
| *F16D 57/06* | (2006.01) |
| *F16D 61/00* | (2006.01) |
| *B60K 17/04* | (2006.01) |

(52) U.S. Cl.
CPC .......................... *B60W 2710/182* (2013.01); *B60W 2720/403* (2013.01); *B60W 2720/406* (2013.01); *Y02T 10/6208* (2013.01)

(56) References Cited

U.S. PATENT DOCUMENTS

| | | | | |
|---|---|---|---|---|
| 5,971,092 | A * | 10/1999 | Walker | B60K 5/08 180/165 |
| 6,877,577 | B1 * | 4/2005 | Smith | B60K 6/12 180/197 |
| 7,562,944 | B2 * | 7/2009 | Walker | B60K 6/12 303/10 |
| 8,132,868 | B2 * | 3/2012 | Walker | B60K 6/12 180/165 |

* cited by examiner

ELECTRO-HYDRAULIC TRACTION SUPPORT

PRIORITY

This application is a continuation-in-part of, and claims priority to, U.S. patent application Ser. No. 13/707,767, filed Dec. 7, 2012. The Ser. No. 13/707,767 application is a non-provisional of, and claims priority to, the Dec. 21, 2011 filing date of U.S. Provisional Patent Ser. No. 61/578,573, the entire content of which is incorporated herein by reference.

FIELD OF THE INVENTION

The present disclosure relates to automotive vehicles, and particularly to an arrangement and method for providing traction support for vehicles.

BACKGROUND OF THE INVENTION

Virtually all automotive vehicles have an engine (or electric motor) that powers two wheels on a common axle via a transmission and differential (for front wheel drive vehicles the differential is often referred to as a transaxle). When a vehicle has a driven wheel stuck in snow, ice or other low friction surface, the wheel can start to spin. Wheel spin causes the power from the engine to be delivered to the spinning wheel, while the wheel positioned on a superior traction surface is not powered due to the inherent action of the differential. To inhibit the above noted phenomena vehicles have been equipped with traction control systems. Traction control typically works by having a controller signal a solenoid valve to automatically selectively connect a vehicle source of pressurized brake fluid with a wheel cylinder to lock the spinning wheel, thereby causing power to be delivered to the wheel with the superior tractive surface underneath. Additionally traction control also may throttle output of the vehicle's engine. If the vehicle is proceeding on an iced surface underneath both driven wheels, the traction control system selectively powers both wheels to a point wherein the wheel does not reach a wheel slip condition, and then alternately locks the wheel, and then again power the wheel, allowing the vehicle to inch forward.

To provide superior traction than that provided by an automotive vehicle with traction control, many vehicles have four wheel drive. Most four wheel drive vehicles have a primary axle that always powers vehicle, and a secondary axle that can be manually engaged to be powered, or can be powered automatically upon sensing of a wheel slip condition on the primary axle. Four-wheel-drive vehicles require two drive shafts, two differentials and a transfer case. The addition of an extra drive shaft, extra differential and transfer case on the vehicle provides a weight penalty (affecting vehicle fuel efficiency) and a cost penalty for added components. The addition of a transfer case often requires the vehicle frame to be raised upward for road clearance purposes. Accordingly, many four wheel drive vehicles are light trucks or sport-utility type vehicles. It is desirable to provide a traction control system for automotive vehicle that additionally provides some of the benefits of a four wheel drive system without the weight penalty of an additional drive shaft, differential and transfer case. It is also desirable to provide the above noted traction control system while adding minimal costs to the vehicle, allowing the traction control system to be utilized on smaller front or rear wheel drive vehicles in a lower cost range. It is also desirable to provide the above noted traction control system in vehicles having a relatively low road clearance.

SUMMARY OF THE INVENTION

To make manifest the above noted and other desires, a revelation of the present invention is brought forth. In a preferred embodiment the present invention endows a freedom of an automotive traction control system having wheels driven on a primary axle via an engine and wheels on a secondary axle torsionally isolated from the engine. Wheel speed sensors and brakes are provided for each wheel, a motor/hydraulic pump is operatively associated with each secondary axle wheel for selectively powering the secondary axle wheel or being regenerativly powered by the secondary axle wheel for regenerative braking. A clutch is provided to connect each secondary axle wheel with the secondary axle wheel's motor/hydraulic pump. An accumulator is provided to hydraulically power the secondary axle wheels and to accept regenerative pressure from the secondary axle wheel's motor/hydraulic pump. A wheel valve is provided for each respective secondary axle wheel for selectively connecting the secondary axle wheel's motor/hydraulic pump with the accumulator. A controller is provided to control the primary axle and secondary axle wheels. The controller commands braking and powering of the primary and secondary axle wheels during low traction events.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
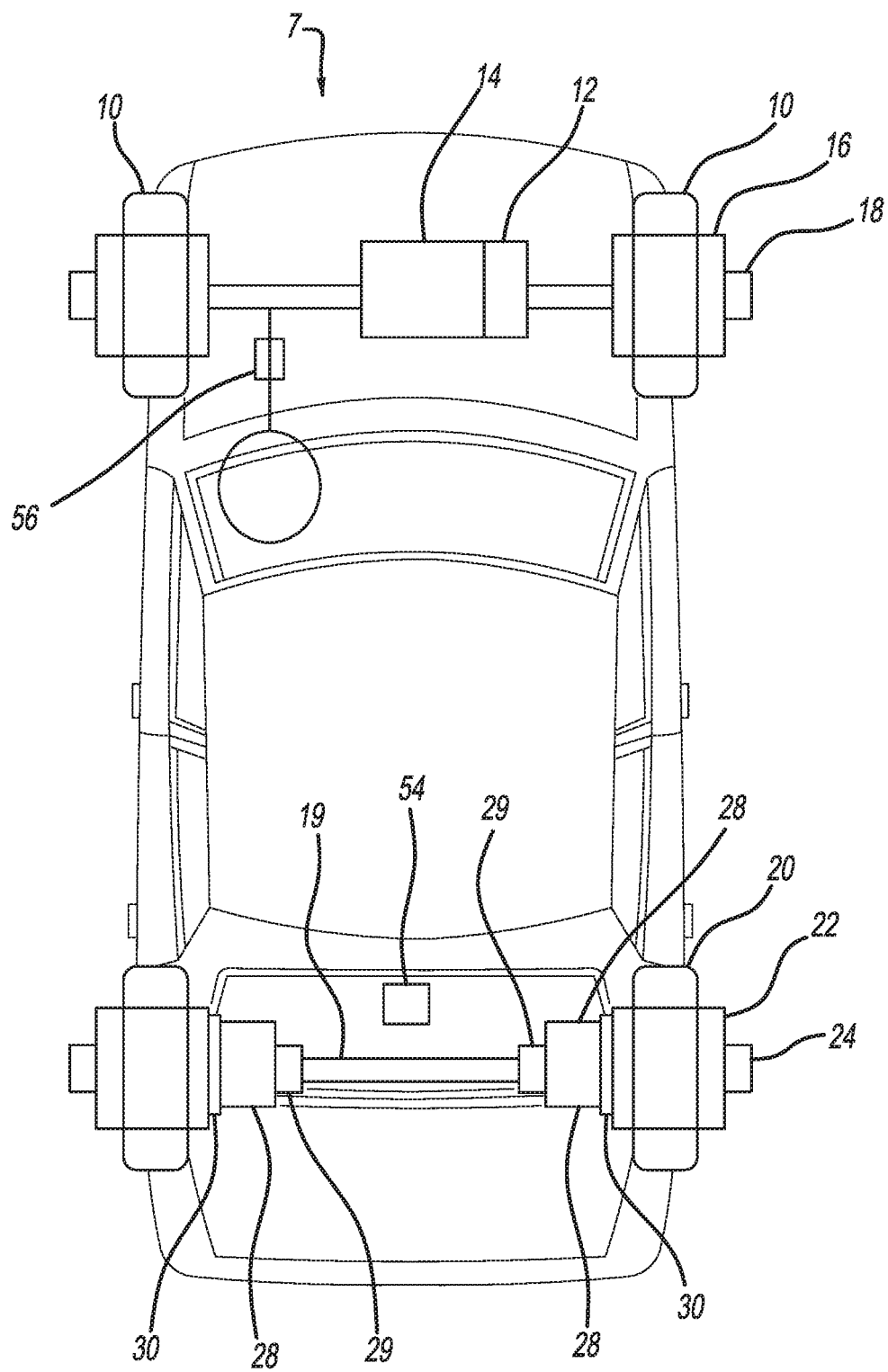
FIG. 1 is a schematic view of a front wheel drive vehicle with a traction control system of the present invention.
Figure 2:
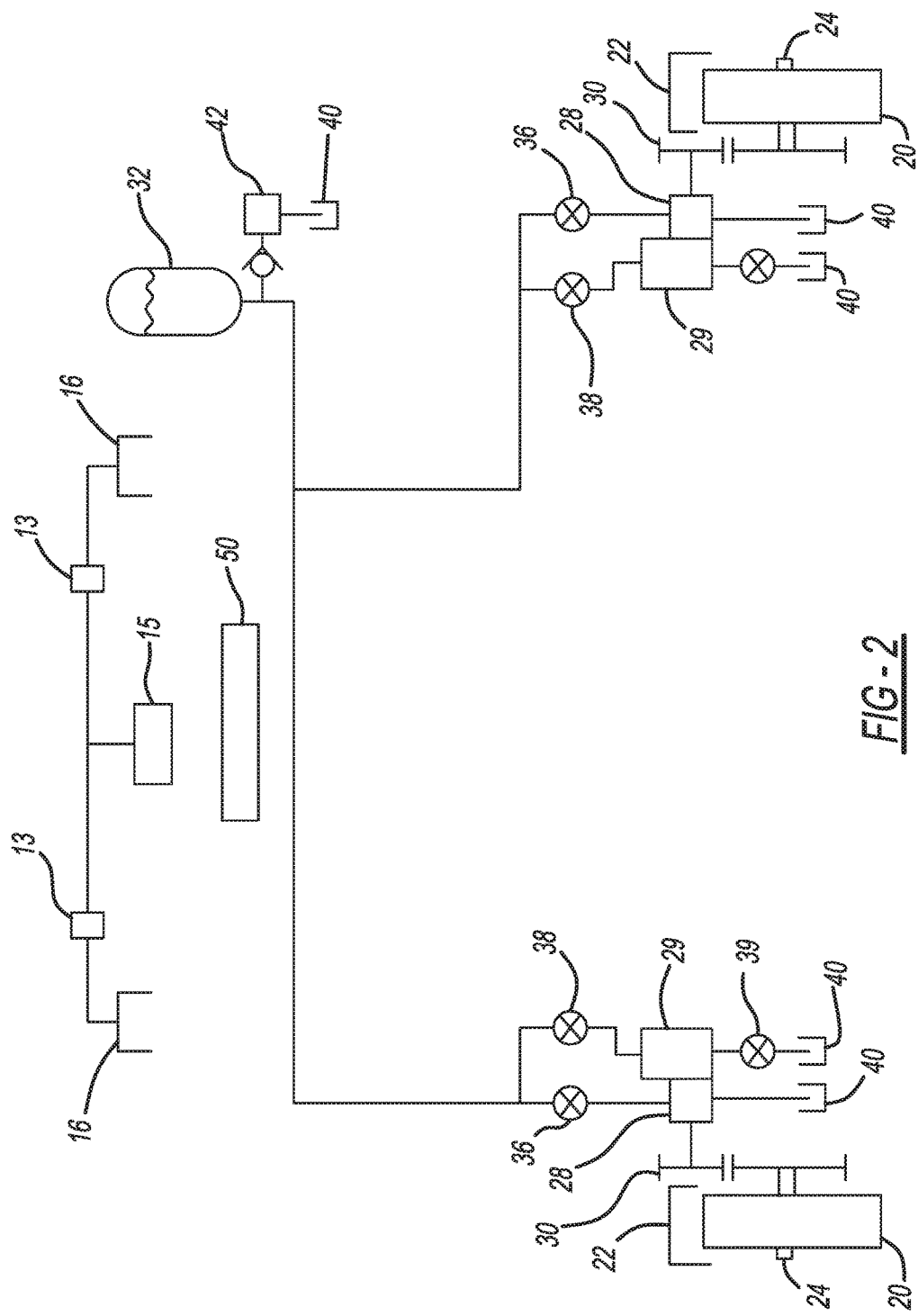
FIG. 2 is a schematic view of the traction control system for the vehicle of FIG. 1.

Referring to FIGS. 1 and 2, a vehicle 7 of the present invention has a traction control system 8 that includes front wheels 10. Powered front wheels 10 are torsionally connected with an engine via a transmission and transaxle 12. Each front wheel 10 has a fluid actuated foundation brake 16 and a sensor 18 to determine potential wheel slip.

Vehicle 7 also has on a secondary axle 19, two non-driven rear wheels 20 that are torsionally isolated from the engine 14. Each rear wheel has a fluid actuated foundation brake 22 operatively associated therewith and a wheel speed sensor 24 to determine potential wheel slip. Each rear wheel 20 has a motor/hydraulic pump 28 operatively associated therewith for selectively powering the rear wheel 20 or being regeneratively powered by the rear wheel 20. Typically, the hydraulic motor portion of the motor/hydraulic pump 28 is a dual directional variable displacement vane pump.

For each rear wheel 20 there is also provided a hydraulic actuator 29 to hydraulically actuate a clutch 30 that selectively torsionally connects the rear wheel with the motor/hydraulic pump 28. In its normal state the clutch 30 is disengaged. In an embodiment to be explained later, the actuator may be electrically powered.

A hydraulic accumulator 32 is also provided. Pressure from hydraulic accumulator 32 is utilized to actuate the clutch 30 to allow the traction control system 8 to selectively power one or both of the rear wheels 20 at equal or variant amounts. Each wheel motor/hydraulic pump 28 is selectively fluidly connected with the accumulator 32 by a solenoid actuated wheel valve 36. In a first biased position, wheel valve 36 does not allow fluid communication between the accumulator 32 and the motor/hydraulic pump 28. In a second position wheel valve 36 allows fluid communication between the accumulator 32 and the motor/hydraulic pump 28 in order to power the rear wheel 20. In a third position wheel valve 36 allows fluid communication between the motor/hydraulic pump 28 to regenerativly charge the accumulator 32 by regenerative braking of the rear wheel 20 so long as pressure generated by the motor/hydraulic pump 28 is greater than that in accumulator 32. Typically the third position of the wheel valve 36 including a check valve allowing flow towards the accumulator 32.

A normally closed solenoid actuated wheel actuator valve 38 is provided to allow the accumulator 32 to hydraulically actuate the clutch actuator 29 to close the clutch 30 to either power wheel 20 or to receive regenerative pressure from the motor/hydraulic pump 28 when the wheel 20 is regenerativly braked. A slave wheel actuator relief valve 39 is also provided that is normally open to a sump 40. When the wheel actuator valve 38 is opened, the wheel actuator relief valve 39 is closed to the sump 40.

Traction control system 8 additionally has a small auxiliary electrically driven pump 42. Pump 42 is connected with the sump 40 and is connected to the accumulator 32 via a check valve. In most instances, the pump 42 takes longer to recharge the accumulator 32 (2-4 minutes) than with the regenerative braking process.

A controller 50 is provided. Controller 50 is connected with the wheel sensors 18 and 24, valves 36, 38, 39, and motor/hydraulic pump 28 and may also be cognizant of the operational states of the engine 14 and the transmission and differential 12. Controller 50 may be an individual component, a part of a larger controller, or functionally distributed among a plurality of electronic components. Controller 50 can also control displacement, port selection, and direction for the motor/hydraulic pump 28. Controller 50 can also be cognizant of the pressure within the accumulator 32 via a pressure sensor.

In operation when vehicle 7 encounters a low traction event, the controller 50 based upon data from wheel speed sensors 18 for the front wheels determine that a low traction event has occurred. Depending upon the amount of wheel slip occurring in one or both of the front wheels 10, controller 50 will lock the differential by braking the spinning front wheels 10 as required (utilizing brake pressurized fluid source 15 and solenoid 13). If further effort is needed to move the vehicle, the controller 50 signals the wheel actuator valve 38 to actuate the clutch actuator 29 and clutch 30 independently on the appropriate rear wheel or wheels 20. Actuation of the clutch 30 causes accumulator 32 to hydraulically power the selective rear wheel or wheels 20 to impart movement of the vehicle 7. Typically, motor/hydraulic pump 28 is bidirectional therefore allowing traction control system 8 to aid in movement of the vehicle when the vehicle is attempting to reverse. Upon detection of appropriate movement of the vehicle the wheel actuator valve 38 is shut off and the wheel valve 36 is shut off.

As stated before, the traction control system 8 can recharge the accumulator 32 by regenerative braking, but the accumulator can be recharged by the pump 42 alone. Using both regenerative braking and the pump 42 speeds up the recharging process. When the vehicle operator brakes the vehicle, the controller 50 activates the actuator 29 by opening actuator valve 38 and the clutch 30. The wheel valve 38 moves to the third position allowing fluid communication between the motor/hydraulic pump 28 and the accumulator 32. The motor/hydraulic pump 28 pumps fluid from the reservoir 40, pressurizing the fluid back into the accumulator 32. The accumulator pressure sensors informs the controller 50 when the accumulator 32 is fully pressurized in order to cease any regenerative braking. Thereafter, normal braking is performed by the normal foundation brake 22.

There are several different operational modes of the traction control system 8. In one mode of operation, if the left front wheel 10 is stuck in the snow, the controller 50 signals to brake the left front wheel 10, thereby transferring power to the right front wheel 10. Controller 10 can then signal power to be delivered to the left rear wheel 20 exclusively, or proportionately power both rear wheels 20 with a larger portion being delivered to the left rear wheel 20 to prevent yaw movement of rear end of the vehicle 7 to the right.

If the vehicle 7 is traversing on ice, controller 50 may tandemly signal both the front 10 and rear 20 right side wheels to move in unison, then lock the wheels with their foundation brakes 16 and 22, and then alternately power the left side front 10 and rear 20 left side wheels. In other conditions such as in mud or light gravel, it may desirable to cross tandemly alternately power and brake front left side wheel 10 and right rear side and then power and brake the right front side wheel 10 and left rear side wheel 20.

The traction control system 8 can optionally have the controller 50 connect with the Electronic Stability Control (ESC) yaw sensor 54 and steering wheel rate sensor 56 via the vehicle's Control Area Network (CAN) bus to automatically power one of the rear wheels 20 upon detection of an undesirable yaw rate condition in the vehicle 7 when the vehicle is traveling in a straight line or when the vehicle is traveling in a curve which deviates from a curve derived from data from the vehicles steering wheel.

In still another mode of operation when the vehicle 7 is stuck in snow, a vehicle operator can manually place the traction control system 8 in a mode as if the vehicle 7 had four wheel drive capabilities to allow the vehicle to take off through a snowpack which has surrounded the parked vehicle. The above action allows the vehicle 7 to plow through the snow for a short distance to get to the road. Such a mode of operation is highly useful when parked vehicles have to overcome obstacles cause by a snowplow that has left a plowed mound of snow at an entrance of a driveway into a residential road.

Figure 3:
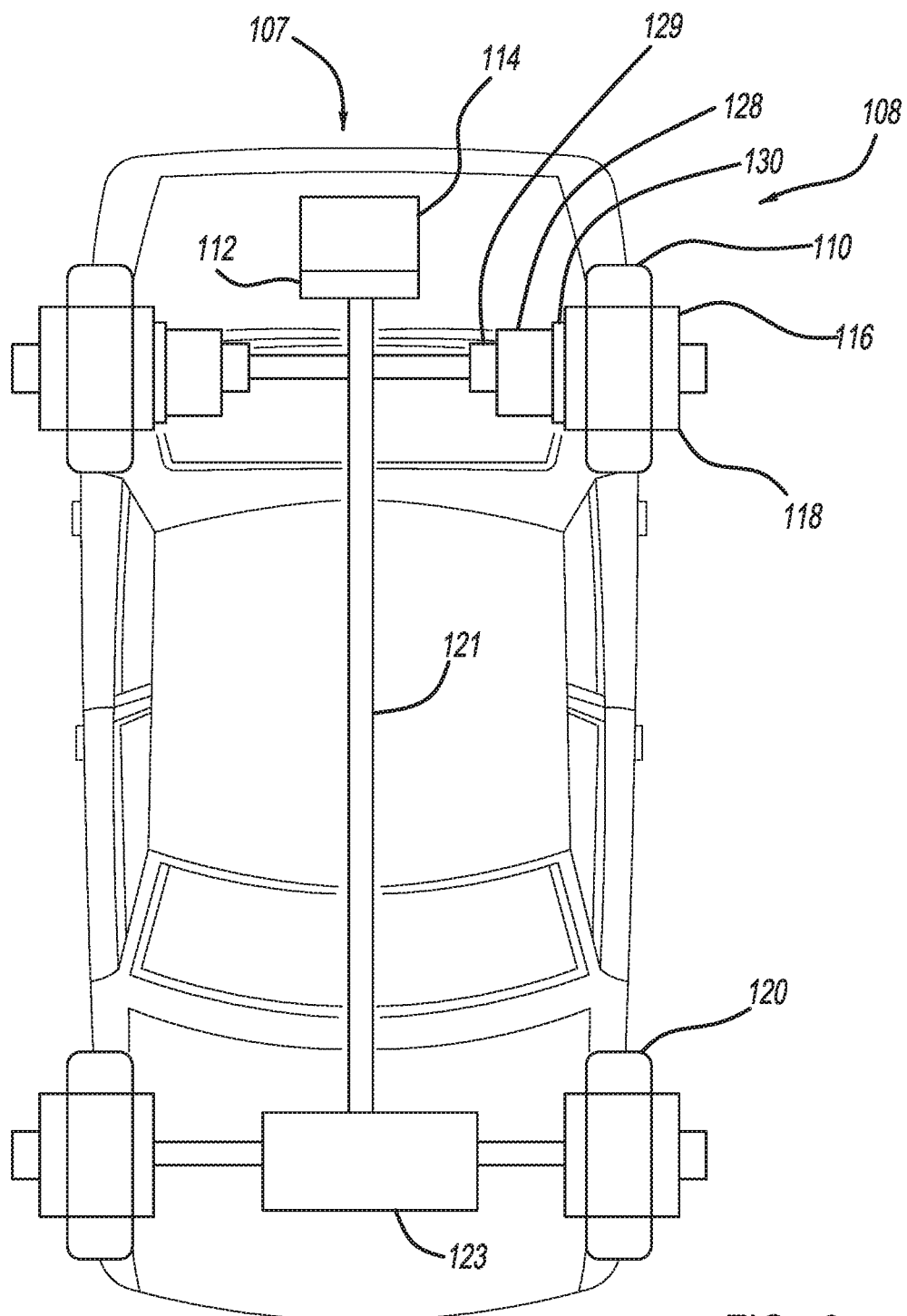
FIG. 3 is a schematic view of a rear wheel drive vehicle with a traction control system of the present invention.
Figure 4:
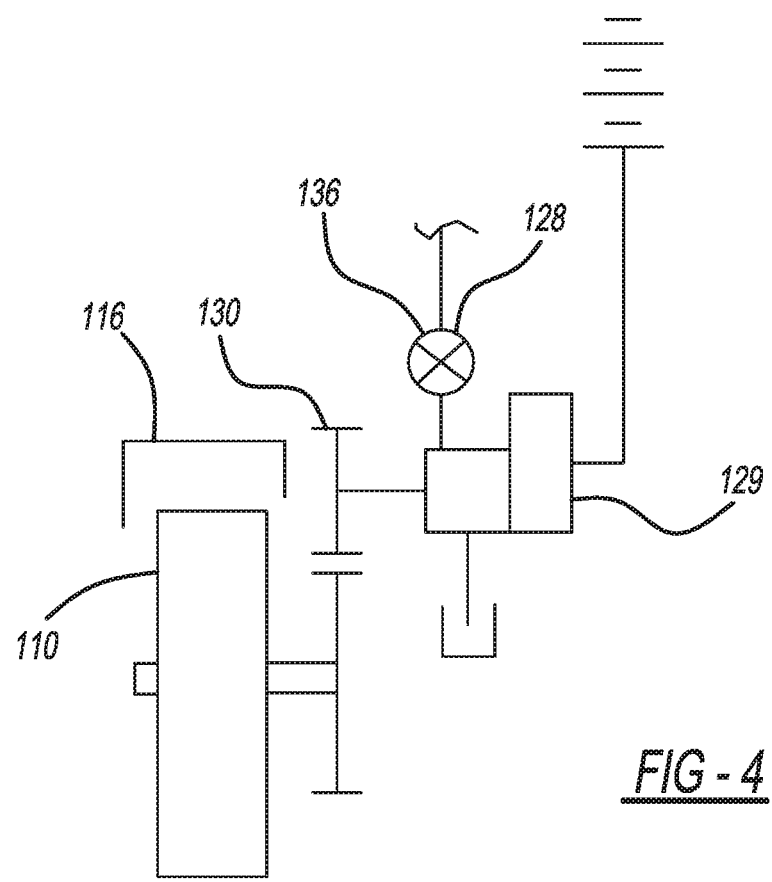
FIG. 4 is a partial schematic view of the traction control system for the vehicle of FIG. 3.

In FIGS. 3 and 4, the traction control system 108 of the present invention is shown on a rear wheel drive vehicle 107 having front wheels 110. Front wheels 110 have a foundation brake 116. Rear wheels 120 are on a primary axle and are powered by an engine 114 via a transmission 112, drive shaft 121 and differential 123. The front wheels 110 have an operatively associated motor/hydraulic pump 128. The traction control system 108 components and operation is vertically identical to that shown in FIGS. 1 and 2 except that it has an electric powered actuator 129 to actuate a clutch 130.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A traction control system for an automotive vehicle having wheels driven on a primary axle via an engine, transmission, and differential, and wheels on a secondary axle torsionally isolated from the engine:
    a wheel speed sensor for each wheel;
    a brake for each wheel;
    a motor/hydraulic pump operatively associated with each wheel on the secondary axle for selectively powering said secondary axle wheel or being regeneratively powered by said secondary axle wheel;
    a clutch to selectively connect each secondary axle wheel with said secondary axle wheel's motor/hydraulic pump;
    a clutch actuator to actuate said clutch;
    an accumulator to hydraulically power said secondary axle wheels and to accept regenerative pressure from said secondary axle wheel's motor/hydraulic pump;
    a wheel valve for each respective secondary axle wheel for selectively connecting said secondary axle wheel's motor/hydraulic pump with said accumulator; and
    a controller to control said primary axle and said secondary axle wheels, said controller selectively controlling braking of said primary axle wheels to prevent wheel spin, said controller controlling said respective secondary axle wheel and said respective wheel clutch actuator to independently selectively power said secondary axle wheels to provide additional traction and to allow regenerative braking of said secondary axle wheels to recharge said accumulator.

2. The traction control system for an automotive vehicle of claim 1, wherein said primary axle is a front axle.

3. The traction control system for an automotive vehicle of claim 1, wherein said primary axle is a rear axle.

4. The traction control system for an automotive vehicle of claim 1, wherein said clutch actuator is hydraulically actuated.

5. The traction control system for an automotive vehicle of claim 1, wherein said clutch actuator is electrically actuated.

6. The traction control system for an automotive vehicle of claim 1, wherein said accumulator is connected with an electrically driven recharging pump.

7. The traction control system for an automotive vehicle of claim 1, wherein said traction control system has a manual mode of operation wherein said wheels on said secondary axle function to provide said vehicle with four wheel drive.

8. The traction control system for an automotive vehicle of claim 1, wherein said traction control system has an operational mode wherein power delivered to said wheels on said secondary axle is proportioned between said wheels.

9. The traction control system for an automotive vehicle of claim 1, wherein said traction control system has an operational mode where power is tandem alternated between wheels on the left and right sides of the vehicle.

10. The traction control system for an automotive vehicle of claim 1, wherein said traction control system has an operational mode wherein power is cross tandem alternated between wheels of said vehicle.

11. The traction control system for an automotive vehicle of claim 1, wherein power delivered to said wheels on said secondary axle is a function of a yaw of said vehicle.

12. The traction control system for an automotive vehicle of claim 1, wherein power delivered to said wheels on said secondary axle is a function of a steering wheel angle of said vehicle.

13. The traction control system for an automotive vehicle of claim 1, wherein said traction control system can operate when said vehicle is powered in reverse.

14. A traction control system for an automotive vehicle having wheels driven on a primary axle via an engine, transmission, and differential, and wheels on a secondary axle torsionally isolated from the engine:
    a wheel speed sensor for each wheel;
    a brake for each wheel;
    a variable displacement motor/hydraulic pump operatively associated with each wheel on the secondary axle for selectively powering said secondary axle wheel or being regeneratively powered by said secondary axle;
    a clutch to selectively connect each secondary axle wheel with said secondary axle wheel's motor/hydraulic pump;
    a clutch actuator to actuate said clutch;
    an accumulator to hydraulically power said secondary axle wheels and to accept regenerative pressure from said secondary axle wheel's motor/hydraulic pump;
    an electric powered recharging pump to recharge said accumulator;
    a three position solenoid controlled wheel valve for each respective secondary axle wheel for selectively connecting said secondary axle wheel's motor/hydraulic pump with said accumulator; and
        a controller to control said primary axle and said secondary axle wheels, said controller selectively controlling braking of said primary axle wheels to prevent wheel spin, said controller controlling said respective secondary axle wheel valve and said respective wheel clutch actuator to independently selectively power said secondary axle wheels to provide additional traction and to allow regenerative braking of said secondary axle wheels to recharge said accumulator.

15. A method of providing traction control on an automotive vehicle having wheels driven on a primary axle via an engine, transmission, and differential, and wheels on a secondary axle torsionally isolated from the engine:
    providing a wheel speed sensor for each wheel;
    providing a brake for each wheel;
    providing a motor/hydraulic pump operatively associated with each wheel on the secondary axle for selectively powering said secondary axle wheel or being regeneratively powered by said secondary axle wheel;
    providing a clutch to selectively connect each secondary axle wheel with said secondary axle wheel's motor/hydraulic pump;
    providing a clutch actuator to actuate said clutch;
    providing an accumulator to hydraulically power said secondary axle wheels and to accept regenerative pressure from said secondary axle wheel's motor/hydraulic pump;
    providing a wheel valve for each respective secondary axle wheel for selectively, connecting said secondary axle wheel's motor/hydraulic pump with said accumulator; and selectively controlling braking of said primary axle wheels preventing wheel spin, and independently selectively powering said secondary axle wheels providing additional traction and allowing regenerative braking of said secondary axle wheels for recharging said accumulator.

16. The method of claim 15 further comprising proportioning the powering of said wheels on said secondary axle.

17. The method of claim 15 further comprising sensing a yaw rate of said vehicle and powering said wheels on said secondary axle as a function of said yaw rate.

18. The method of claim 15 further comprising sensing a steering angle of said vehicle and powering said wheels on said secondary axle as a function of said steering angle.

19. The method of claim 15 further comprising tandemly alternating the powering of said wheels on said primary and secondary axles.

20. The method of claim 15 further comprising cross tandemly alternating the powering of said wheels on said primary and secondary axles.

\* \* \* \* \*